Nov. 21, 1939.   M. L. RUDOLPH   2,181,070
DEVICE FOR PREVENTING PICK-OUTS
Filed Jan. 14, 1938
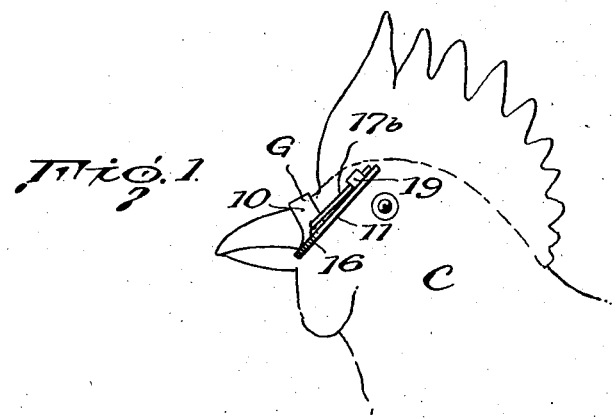
Fig. 1.
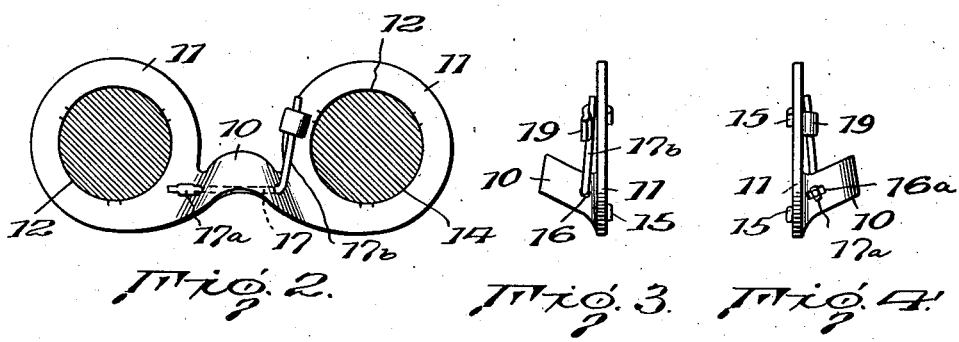
Fig. 2.   Fig. 3.   Fig. 4.
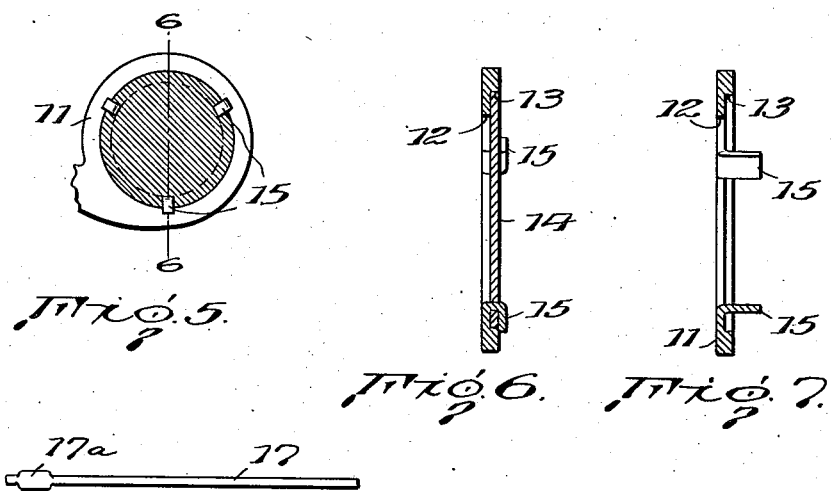
Fig. 5.   Fig. 6.   Fig. 7.
Fig. 8.
Inventor
Maurice L. Rudolph
By Wm. S. Hodges
Attorney Patented Nov. 21, 1939

2,181,070

UNITED STATES PATENT OFFICE 2,181,070

DEVICE FOR PREVENTING PICK-OUTS

Maurice L. Rudolph, Vineland, N. J.

Application January 14, 1938, Serial No. 185,059

8 Claims. (Cl. 119—97)

This invention is a device constructed and arranged to be detachably connected to the beak of a chicken, turkey or other fowl so as to prevent cannibalism.

The existence of the practice of cannibalism among poultry is well recognized by poultry raisers as a serious menace to the health of a brood, and is a frequent cause of a material drop in production. Apparently such cannibalism is induced by improper feeding, and principally by the failure to amply supply meat and blood constituents with the food, which constituents healthy and vigorous fowls require and constantly crave. While the cannibalistic urge is upon them, the fowls will be attracted to anything of a reddish or flesh color, and hence attack any exposed portions of other fowls.

Attempts heretofore made to reduce cannibalism have resulted in the development of several distinct types of guards or shields. One well known type is in the form of a plate adapted to be suspended over the vent of the fowl, so that the other birds are prevented from picking out the unlaid egg or otherwise injuring the one that is equipped with the shield. Another type is in the form of a mask or blinder, so arranged as to interfere with the vision of the fowl equipped therewith, and in such manner that it cannot readily see the other fowls. While the blinder devices are more or less successful in preventing pick-outs, they so obscure the vision of the fowls as to greatly hamper them in their normal movements about the runways, and to and from nests, roosts, etc.

One of the objects of the present invention is to provide a simple device which may be removably attached to the beak of a fowl, in a manner similar to the attachment of the mask devices above referred to, but in the form of "goggles" having openings through which the fowl may have free vision. Said openings, however, are closed by transparent colored material which will neutralize or modify the normal flesh-colored and reddish shades in such manner that they will not be recognized by the fowl to which the device is attached. A further object is to provide a simple and inexpensive device which may be readily and easily attached to or detached from the beak of a fowl.

The invention will be hereinafter fully set forth and particularly pointed out in the claims.

In the accompanying drawing:

Figure 1 is a view illustrating the head of a chicken in side elevation, and equipped with the "pick-out" preventing "goggles" of the present invention.

Figure 2 is a front elevation of the device removed from the chicken.

Figures 3 and 4 are opposite end views of Figure 2.

Figure 5 is a rear elevation of a portion of Figure 2.

Figure 6 is a vertical sectional view on the line 6—6 of Figure 5.

Figure 7 is a vertical sectional view on the line 6—6, Figure 5, with the transparent window removed.

Figure 8 is a detail of the securing wire prior to bending.

Referring to the drawing, C designates the head of a chicken, which has been selected for illustrative purposes, and without intent to limit the use of the invention, it being understood that the present invention is equally applicable to turkeys and other domestic fowls. Pivotally mounted in the beak of the fowl is a pick-out-preventing device G similar to a pair of goggles.

Specifically, the device G is constructed of sheet metal and consists of an arcuate portion shaped to straddle the beak of the fowl. Said arcuate member is so shaped that its under surface will bear upon and approximately conform to the cross sectional contour of the upper mandible of the beak of a fowl so as to prevent approximately all movement of the arcuate member with respect to said mandible while the device is in position. The ends of said arcuate member are connected to and merge with two goggle members 11, each of which is provided with an opening 12 in the center thereof. The peripheral edge of each opening 12 is provided with a shoulder-like annular seat 13, upon which rests a member 14 of transparent material, preferably Celluloid, and also preferably of a green shade. The edge of each seat 13 is provided with a plurality of integral lugs 15, which are extended through complemental openings in the colored member 14, and bent over against the contiguous surface of the goggle member 11, so as to retain the transparent member in place.

It will be observed that the arcuate member 10 is provided with two aligned openings 16 and 16ª respectively, through which may be passed the haft of a pin-like attaching device 17, the latter having an angular extension 17ᵇ, which may be fastened beneath a lug 19 on one of the members 11. The opening 16ª is slightly elongated to permit passage of a flattened enlargement 17ª on the said pin 17.

In practice, the device is positioned by placing the arcuate member 10 over the upper mandible of the beak of the fowl, and then passing the headed end 17ª of the bent pin 17 through the openings 16 and 16ª, and also through the breathing openings in the beak. After the pin has been inserted in the manner stated, it is partially rotated so as to bring the angular portion 17ᵇ to a position where it may be caught under the lug 19, and thereby place the flattened portion 17ª transversely across the opening 16ª. By means of this arrangement the device is securely retained in place and held in an approximately stationary position because the width of the arcuate member is such as to provide a bearing surface of sufficient area to approximately prevent relative movement thereof with respect to the beak, in such manner as to approximately prevent any rocking movement of the device on the fowl, as well as lateral movement relative to the beak. While in the position shown, the normal vision of the fowl is not interfered with because of the openings 12, but by reason of the modification of the red and pink shades as they pass through the transparent green members, the fowl is unaware of them, and the cannibalistic tendencies of the fowl are not excited and as a result the rest of the brood are not likely to be attacked.

The advantages of the invention will be readily understood by those skilled in the art to which it belongs. It will be observed that by the use of the device hereinbefore described, the normal activities of the fowl are not hampered or interfered with, because the vision is in no way impaired. Therefore, the fowl will have no difficulty in feeding, in moving about the runway at will, or in reaching nests, roosts and the like, and yet the urge to attack other fowls is practically overcome. It is to be understood that although the invention as described refers to the use of transparent goggle members preferably of a green shade, it is not intended to limit the invention to this particular shade, because obviously other shades may be used without departing from the spirit of the invention. Therefore, wherever the terms "color modifying window" or "transparent colored disks" or "color modifying disks" and the like are used, it is intended to designate a color which will have the characteristic of neutralizing or modifying the normal flesh colored and reddish shades which tend to induce cannibalism among fowls, and in such manner that said normal flesh colored and reddish shades will not be recognized by the fowl to which the device is attached.

Having thus explained the nature of the invention and described an operative manner of constructing and using the same, although without attempting to set forth all of the forms in which it may be made, or all of the forms of its use, what is claimed is:

1. A goggle-like device for preventing pick-outs comprising two spaced apart members connected by an intermediate arcuate portion adapted to rest upon the beak of a fowl, transparent color modifying means carried by said arcuate portion, said arcuate portion having oppositely disposed openings one of which is elongated, and a pin adapted to be passed through said openings and also through the breather openings of the fowl so as to anchor the device to said beak, said pin being rotatable within said openings and having a flattened portion adapted to extend transversely across said elongated opening upon partial rotation of said pin.

2. A goggle device for preventing pick-outs among poultry comprising an arcuate member adapted to straddle, rest upon, and to approximately conform to the cross sectional contour of the upper mandible of the beak of a fowl, two goggle members supported in spaced relation by said arcuate member and extending upwardly from the ends of the latter, each of said members being provided with a color modifying window, and means extendible through said arcuate member for attaching the device to said mandible, said arcuate member being of such area as to approximately prevent relative movement thereof with respect to the mandible while the device is in operative position.

3. A goggle device for preventing pick-outs among poultry comprising an arcuate member adapted to straddle, rest upon, and to approximately conform to the cross sectional contour of the upper mandible of the beak of a fowl, two goggle members supported by said arcuate member in spaced relation and extending upwardly from the ends of the latter, and a securing pin extendible through said arcuate member for removably attaching the device to said mandible, said arcuate member being of such area as to approximately prevent relative movement thereof with respect to the mandible while the device is in operative position.

4. A goggle device for preventing pick-outs among poultry comprising an arcuate member shaped to straddle, rest upon, and to approximately conform to the cross sectional contour of the upper mandible of the beak of a fowl, two goggle members supported in spaced relation by said arcuate member and extending upwardly from the ends of the latter, each of said members having an opening therein, color modifying disks, means for securing said disks in positions across said openings, and means extendible through said arcuate member for attaching the device to said mandible, said arcuate member being of such area as to approximately prevent relative movement thereof with respect to said mandible while the device is in operative position.

5. A goggle device for preventing pick-outs among poultry comprising an arcuate member shaped to straddle, and to rest upon, and to approximately conform to the cross sectional contour of the upper mandible of the beak of a fowl, the arms of said arcuate member having aligned openings therein, two goggle members supported in spaced relation by said arcuate member and extending upwardly from the ends of the latter, each of said members having an opening therein, color modifying transparent disks, one for each opening, means for securing said disks in position across the respective openings, and a securing pin extendible through the openings in said arcuate member for attaching the device to said mandible, said arcuate member being of such area as to approximately prevent relative movement thereof with respect to the mandible while the device is in operative position.

6. A goggle device for preventing pick-outs comprising two spaced apart goggle members connected by an intermediate arcuate member, the latter being so shaped as to rest upon the upper mandible of the beak of a fowl, each of the goggle members having an opening therein and an annular seat surrounding said opening, transparent colored disks resting upon said seats, lugs for anchoring said disks to said goggle members in such manner as to cover said openings, and means extendible through said arcuate member for attaching the device to said mandible, said arcuate member being of such area as to approximately prevent relative movement thereof with respect to said mandible while the device is in operative position.

7. A goggle-like device for preventing pick-outs comprising two spaced apart upright members connected by an intermediate arcuate portion adapted to rest upon and straddle the beak of a fowl, transparent color modifying means carried by said arcuate portion, a pivot pin adapted to be passed through said arcuate portion and also through the breather openings in the beak of the fowl so as to anchor the device to said beak, said arcuate member being of such area as to approximately prevent relative movement thereof with respect to the mandible while the device is in operative position, said pin having an angular portion, one of said upright members having a lug to engage said angular portion.

8. In a device for application to the beak of a fowl, said device having portions adapted to be positioned in front of and in close proximity to the eyes of a fowl, a bridge member of arcuate formation, and a fastening means extendible through arcuate portions of said bridge member and also through the beak of the fowl in such manner as to attach the device to said beak, said arcuate member being of such area as to approximately prevent relative movement thereof with respect to the beak while the device is in operation.

MAURICE L. RUDOLPH.